US012713217B2

(12) United States Patent
Iwata

(10) Patent No.: US 12,713,217 B2
(45) Date of Patent: Aug. 18, 2026

(54) CONTROL APPARATUS, CONTROL METHOD, AND STORAGE MEDIUM

(71) Applicant: CANON KABUSHIKI KAISHA, Tokyo (JP)

(72) Inventor: Toshihiro Iwata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 263 days.

(21) Appl. No.: 18/746,906

(22) Filed: Jun. 18, 2024

(65) Prior Publication Data

US 2024/0430652 A1 Dec. 26, 2024

(30) Foreign Application Priority Data

Jun. 26, 2023 (JP) ................................ 2023-104585

(51) Int. Cl.
*H04W 4/80* (2018.01)

(52) U.S. Cl.
CPC .................................... *H04W 4/80* (2018.02)

(58) Field of Classification Search
CPC . H04W 74/0833; H04W 72/23; H04W 72/21; H04W 74/0838; H04W 4/029; H04W 52/0251; H04W 76/27; H04W 76/38; H04W 52/0206; H04W 52/0229; H04W 52/0254; H04W 52/0261; H04W 72/51; H04W 4/02; H04W 4/70
USPC ........................................................ 455/41.2
See application file for complete search history.

(56) References Cited

U.S. PATENT DOCUMENTS

2022/0262504 A1* 8/2022 Bratty .................... G16H 20/30
2023/0401274 A1* 12/2023 Denninghoff ....... G06F 16/9577

FOREIGN PATENT DOCUMENTS

JP 2005223487 A 8/2005
WO 2017163857 A1 9/2017

* cited by examiner

*Primary Examiner* — Ajibola A Akinyemi
(74) *Attorney, Agent, or Firm* — Canon U.S.A., Inc., IP Division

(57) ABSTRACT

An acquisition unit acquires first setting information for tracking processing on an object using a first wireless apparatus. A tracking control unit controls the tracking processing on the object based on radio waves received from the first wireless apparatus by a communication unit and the first setting information. A determination unit determines whether to stop the tracking processing using the first wireless apparatus based on the radio waves received from the first wireless apparatus. When the determination unit determines that the tracking processing using the first wireless apparatus is to be stopped, the communication unit is made to transition to a mode for connecting a new wireless apparatus. When the communication unit and the new wireless apparatus are connected, the tracking control unit uses second setting information based on the first setting information, as setting information for tracking processing on the object using the new wireless apparatus.

13 Claims, 7 Drawing Sheets

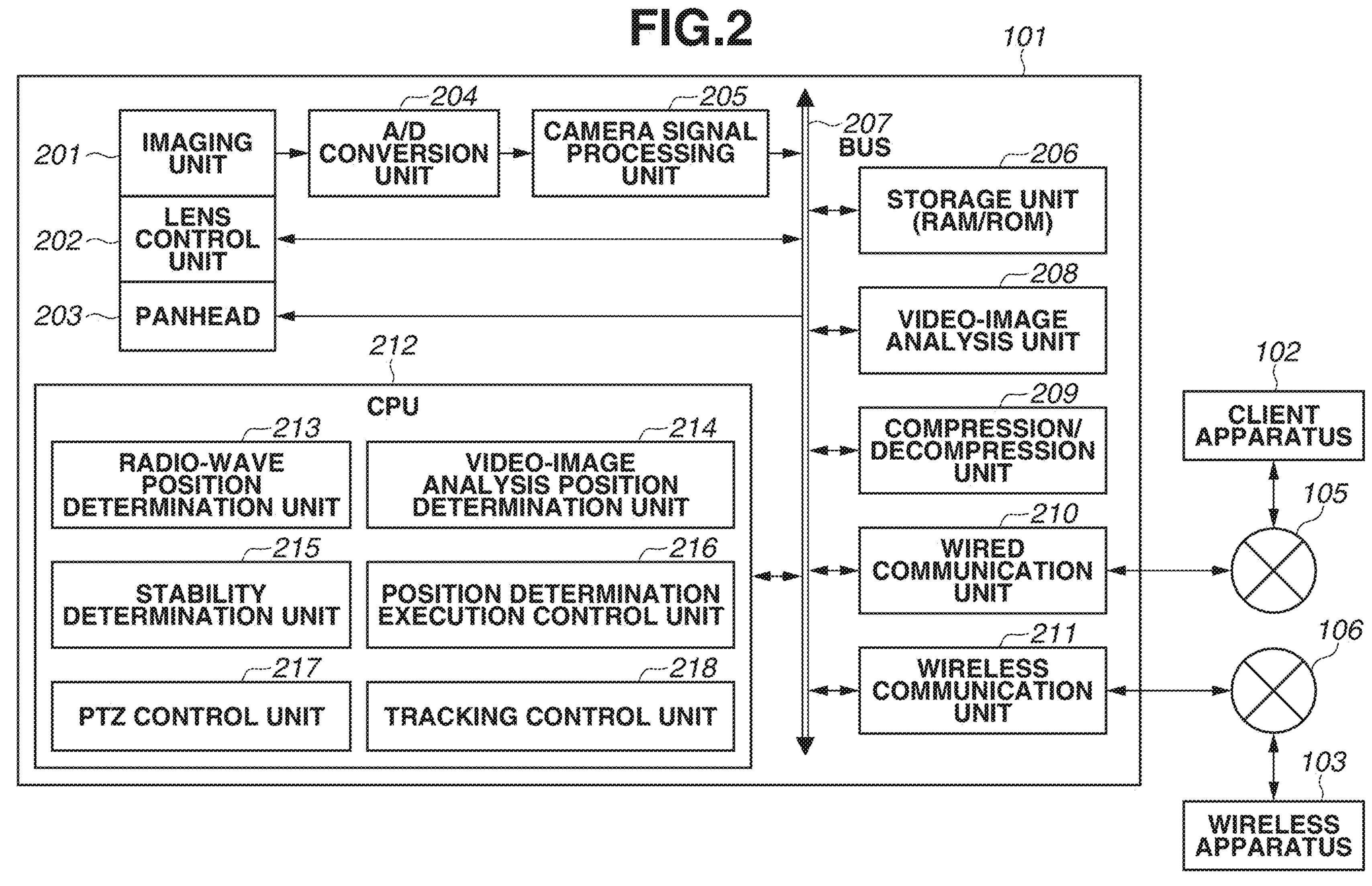
FIG.2
101
201
IMAGING UNIT
202
LENS CONTROL UNIT
203
PANHEAD
204
A/D CONVERSION UNIT
205
CAMERA SIGNAL PROCESSING UNIT
207
BUS
206
STORAGE UNIT (RAM/ROM)
208
VIDEO-IMAGE ANALYSIS UNIT
209
COMPRESSION/ DECOMPRESSION UNIT
210
WIRED COMMUNICATION UNIT
211
WIRELESS COMMUNICATION UNIT
212
CPU
213
RADIO-WAVE POSITION DETERMINATION UNIT
214
VIDEO-IMAGE ANALYSIS POSITION DETERMINATION UNIT
215
STABILITY DETERMINATION UNIT
216
POSITION DETERMINATION EXECUTION CONTROL UNIT
217
PTZ CONTROL UNIT
218
TRACKING CONTROL UNIT
102
CLIENT APPARATUS
105
106
103
WIRELESS APPARATUS

CONTROL APPARATUS, CONTROL METHOD, AND STORAGE MEDIUM

BACKGROUND

Field

The present disclosure relates to a control technique relating to a wireless apparatus.

Description of the Related Art

There are known cameras that can control pan, tilt, and zoom. Some of such cameras include a function of automatically controlling (tracking) an imaging direction based on the position of an object, enabling the object to continuously be in a screen.

The position of an object that is a person is often determined using video image analysis, such as human body detection. However, the object that is a person cannot be detected depending on the imaging environment, such as color change caused by illumination fluctuation, and the state of the object in a video image, such as the orientation and the posture of the person, resulting in unstable tracking.

Meanwhile, the technique for determining the position of an object using wireless communication has risen in recent years. The Bluetooth® version 5.1 as a wireless communication standard newly includes a specification relating to a (direction detection) function of detecting the direction of incoming radio waves (radio wave direction). With wireless communication modules compliant with the Bluetooth® version 5.1 installed into both a camera and a wireless apparatus, the wireless communication module in the camera can determine the direction of incoming radio waves from the wireless apparatus, allowing the wireless apparatus to be located. Further, an object holding the wireless apparatus can be located by the camera.

Such a method can carry out the automatic tracking with an automatic tracking setting set on the camera in association with identification (ID) information (identifier) for discriminating the wireless apparatus held by the object from the other wireless apparatuses.

In the method using wireless apparatuses, the wireless apparatuses in use are assumed to be battery-powered wireless apparatuses. The battery of a wireless apparatus that is carrying out the automatic tracking can run out. In addition, the wireless apparatus can fail, making it difficult to determine the position of the wireless apparatus.

In such a case, to reduce as much time during which the automatic tracking is interrupted as possible, the used wireless apparatus can be replaced with another wireless apparatus to resume the automatic tracking.

Japanese Patent Application Laid-Open No. 2005-223487 discusses a technique of comparing device data received from a device newly connected and device data received from an existing device to determine whether the newly-connected device is a replacement, and if the newly-connected device is determined to be a replacement, sending device data with the same identifier as that of the existing device assigned to the newly-connected device. This case is based on the premise that the existing device is present in the network, so that if the existing device fails before a new device is connected, the replacement operation cannot be performed.

In addition, International Publication No. WO2017/163857 discusses a technique of determining model information on a new device through a server prepared in advance, in response to the connection of a new device, and automatically registering the new device.

International Publication No. WO2017/163857, however, involves preparing the server and information about what device models are registerable, which deteriorates usability.

SUMMARY

The present disclosure is directed to facilitating setting for tracking even when a wireless apparatus used for the tracking is replaced.

According to an aspect of the present disclosure, a control apparatus includes at least one memory storing instructions, and at least one processor that, upon execution of the instructions, is configured to operate as, a communication unit configured to communicate with a first wireless apparatus for determining a position of an object, the first wireless apparatus being held by the object; an acquisition unit configured to acquire first setting information for tracking processing on the object using the first wireless apparatus, a tracking control unit configured to control the tracking processing on the object based on radio waves received from the first wireless apparatus by the communication unit and the first setting information; and a determination unit configured to determine whether to stop the tracking processing using the first wireless apparatus, based on an intensity of the radio waves received from the first wireless apparatus, wherein, when the determination unit determines that the tracking processing using the first wireless apparatus is to be stopped, the communication unit transitions to a mode for connecting a new wireless apparatus, and wherein, when the communication unit and the new wireless apparatus are connected, the tracking control unit uses second setting information based on the first setting information, as setting information for tracking processing on the object using the new wireless apparatus.

Further features of the present disclosure will become apparent from the following description of exemplary embodiments with reference to the attached drawings.

BRIEF DESCRIPTION OF THE DRAWINGS

FIG. 2 is a block diagram illustrating the configuration of a network camera according to each of the exemplary embodiments.

DESCRIPTION OF THE EMBODIMENTS

Some exemplary embodiments of the present technique are described in detail with reference to the accompanying drawings. In the following description, meaning of the term "video image" is not limited to a moving image, and the video image may be a still image. Further, meaning of the term "image" is not limited to a still image, and the image may be a moving image.

Figure 1:
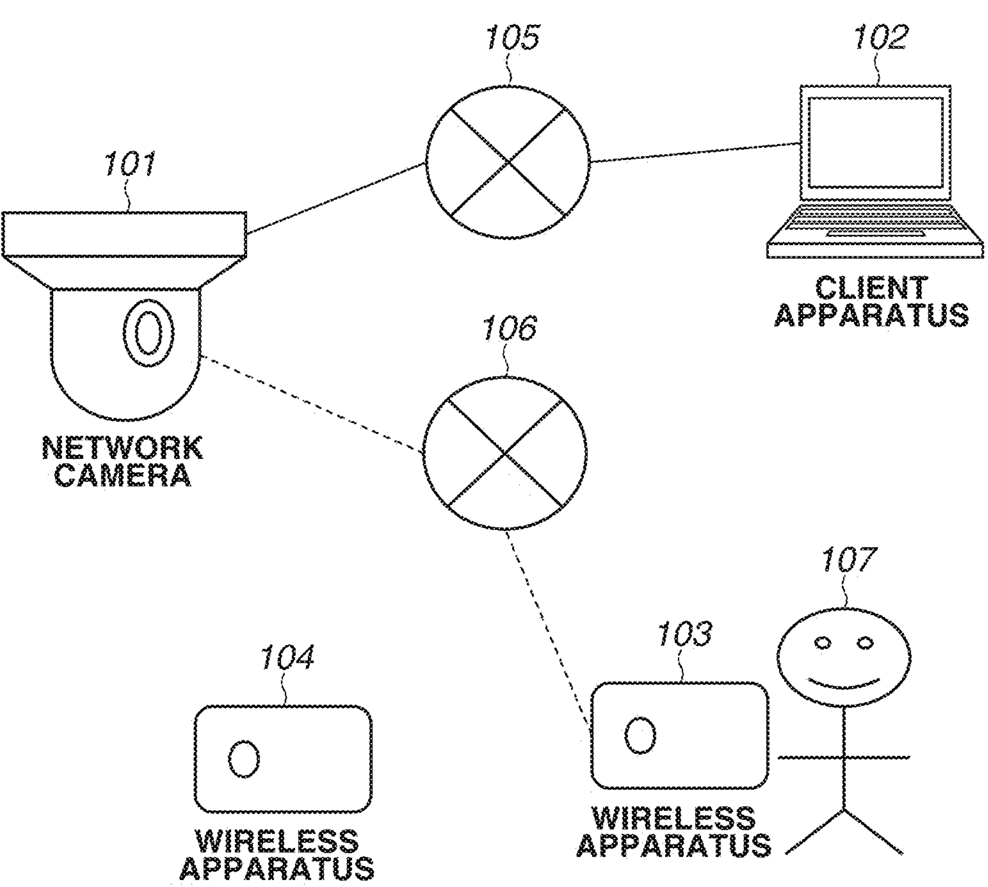
FIG. 1 is a diagram illustrating a configuration example of a system according to exemplary embodiments.

FIG. 1 is a diagram illustrating an example of a system configuration according to a first exemplary embodiment. The system configuration includes a network camera (an imaging apparatus including a control apparatus) 101, a client apparatus 102, a wireless apparatus 103, and a wireless apparatus 104. These apparatuses are connected through a network 105 and a wireless network 106.

In the present exemplary embodiment, an example will be described in which the network camera 101 functions as a control apparatus. The portion functioning as the control apparatus may be provided outside the network camera 101. For example, the client apparatus 102 can function as the control apparatus.

The network camera 101 can perform video image distribution and camera control through a wired or wireless network.

The client apparatus 102 is connected through the network 105 to the network camera 101. A user can control the network camera 101 through an operation screen (a browser, etc.) displayed on the client apparatus 102. Further, the client apparatus 102 outputs (displays) various kinds of information acquired from the network camera 101.

The wireless apparatus 103 and the wireless apparatus 104 are each provided with a wireless communication module complying with a direction detection function in a specification of the Bluetooth® 5.1, and are connected to the network camera 101 through the wireless network 106. The Bluetooth® 5.1 is merely an example, and wireless communication complying with any of other standards can be used.

The wireless apparatus 104 is a wireless apparatus used as a replacement in a case where the wireless apparatus 103 is unusable. In the present exemplary embodiment, to automatically track an object 107 by the network camera 101, the wireless apparatus 103 or the wireless apparatus 104 is held by the object 107. More wireless apparatuses can be used. In this case, the wireless apparatuses can be held by different objects to be tracked.

The network 105 is a network for distributing a video image captured by the network camera 101 to, for example, an external recording server. In the present exemplary embodiment, a communication form of the network 105 is a wired local area network (LAN), but can be a wireless LAN.

The wireless network 106 enables mutual communication between the network camera 101 and each of the wireless apparatuses 103 and 104 in conformity to any wireless communication standard, such as Bluetooth®, Z-Wave®, and Zigbee®.

A configuration of the network camera 101 in the system configuration will now be described with reference to a block diagram in FIG. 2.

An imaging unit 201 includes a zoom lens, a focus lens, a diaphragm, and an imaging element. The zoom lens and the focus lens are moved along the optical axis by a lens control unit 202. The diaphragm is driven by the lens control unit 202 and then operated. The imaging element photoelectrically converts light that passes through the zoom lens, the focus lens, and the diaphragm, into an analog image signal. The analog image signal is subjected to amplification processing by sampling, and the resultant signal is then output to an analog-to-digital (A/D) conversion unit 204.

A panhead 203 includes a pan driving unit and a tilt driving unit (neither illustrated), and can control the pan driving unit and the tilt driving unit to rotate (move) the imaging unit 201 in horizontal directions (pan directions) and vertical directions (tilt directions) through an actuator (not illustrated).

The A/D conversion unit 204 converts the analog image signal into a digital image signal, and outputs the digital image signal to a camera signal processing unit 205.

The camera signal processing unit 205 performs various kinds of image processing on the digital image signal, to generate a video image signal. Examples of various kinds of image processing include offset processing, gamma correction processing, gain processing, RGB interpolation processing, noise reduction processing, and color tone correction processing.

A storage unit 206 includes a random access memory (RAM), a read only memory (ROM), and a storage device that writes information to the RAM and the ROM.

The RAM is a volatile memory, such as a static RAM (SRAM) and a dynamic RAM (DRAM), and the ROM is a nonvolatile memory, such as an electrically erasable programmable ROM (EEPROM) and a flash memory. The storage device is, for example, a hard disk drive (HDD) or a solid state drive (SSD). Programs for implementing functions according to the present exemplary embodiment and data used in execution of the programs are stored in the ROM. These programs and the data are appropriately loaded to the RAM through a bus 207 under the control of a central processing unit (CPU) 212, and the programs are executed by the CPU 212. Thus, the CPU 212 functions as units according to the present exemplary embodiment.

A video-image analysis unit 208 is a processing unit performing video image analysis, such as human body detection, face detection, and moving body detection, to perform various kinds of detection processing. In the present exemplary embodiment, as an example of video image analysis for determining the position of the object 107, human body detection for detecting a human body in an image frame is used. However, the video image analysis is not limited thereto. Depending on the use scene, face detection or moving body detection can be used. The video image analysis result is notified to the CPU 212 through the bus 207.

A compression/decompression unit 209 performs compression processing on a captured image to generate compressed data, in response to a control instruction from the CPU 212 through the bus 207. If data compression is unnecessary, the compression/decompression unit 209 can be omitted.

A wired communication unit 210 performs communication with the client apparatus 102 through the network 105.

A wireless communication unit 211 performs wireless communication with the wireless apparatus 103 and/or the wireless apparatus 104 through the wireless network 106. In the present exemplary embodiment, the wireless communication unit 211 uses a wireless communication module complying with the Bluetooth® 5.1 specification. However, the wireless communication module is not limited thereto. A wireless communication module can be externally connected using a general-purpose interface, such as a universal serial bus (USB), to function as the wireless communication unit 211.

The CPU 212 is a central processing unit. The CPU 212 includes a radio-wave position determination unit 213, a video-image analysis position determination unit 214, a stability determination unit 215, a position determination execution control unit 216, a pan/tilt/zoon (PTZ) control unit 217, and a tracking control unit 218 according to the present exemplary embodiment. The units will now be described.

The radio-wave position determination unit 213 determines the relative position of each of the wireless apparatuses 103 and 104 as viewed from the network camera 101 by detecting the direction (an incoming direction) of radio waves transmitted from the wireless apparatuses 103 and 104. The position is determined based on the direction detection function complying with the Bluetooth® 5.1 specification, and details thereof will be described below with reference to FIG. 4.

The video-image analysis position determination unit 214 determines the position of the object 107 in an image captured by the imaging unit 201 based on a human body detection result of the video-image analysis unit 208. In other words, the video-image analysis position determination unit 214 functions as a determination unit that determines the position of the object by performing video image analysis on image data acquired by the imaging unit 201, in cooperation with the video-image analysis unit 208.

The stability determination unit 215 determines whether position determination performed by the above-described radio-wave position determination unit 213 is stably performable. In other words, the stability determination unit 215 determines whether the determination of the position of the object is stably performable in automatic tracking, based on a predetermined rule. Details will be described with reference to FIG. 5 and subsequent drawings. With the predetermined rule satisfied, the stability determination unit 215 determines that the position determination is stably performable. Otherwise, the stability determination unit 215 determines that the position determination is unstable.

The position determination execution control unit 216 controls object position determination processing performed by the radio-wave position determination unit 213 and the video-image analysis position determination unit 214. For example, if the position determination performed by the radio-wave position determination unit 213 is unstable, the position determination execution control unit 216 performs control to perform the position determination through the position determination performed by the video-image analysis position determination unit 214 alone.

The PTZ control unit 217 controls the driving of pan/tilt/zoom (hereinafter, referred to as a PTZ driving) using the lens control unit 202 and the panhead 203 based on the position of the object acquired through the position determination performed by the radio-wave position determination unit 213 or the video-image analysis position determination unit 214. In this example, it is sufficient to track the object by performing at least the pan driving, the tilt driving, or the zoom driving. In addition, the PTZ driving is controlled to orient the imaging direction of the network camera 101 to the position of the object 107, which makes it possible to automatically track the object 107. For example, the automatic tracking is performed such that the object is constantly captured at the center of the image. The object does not always need to be constantly captured at the center of the image, and the automatic tracking can be performed such that at least the object is not out of the image.

The tracking control unit 218 performs the automatic tracking in cooperation with other units. The tracking control unit 218 performs the automatic tracking based on various kinds of parameters (setting information for tracking) previously set by the user. For example, the device identification information (ID) unique to a wireless apparatus to be tracked is registered as a parameter, which permits the position of a specific apparatus alone to be determined and tracked even among a plurality of wireless apparatuses.

Figure 3:
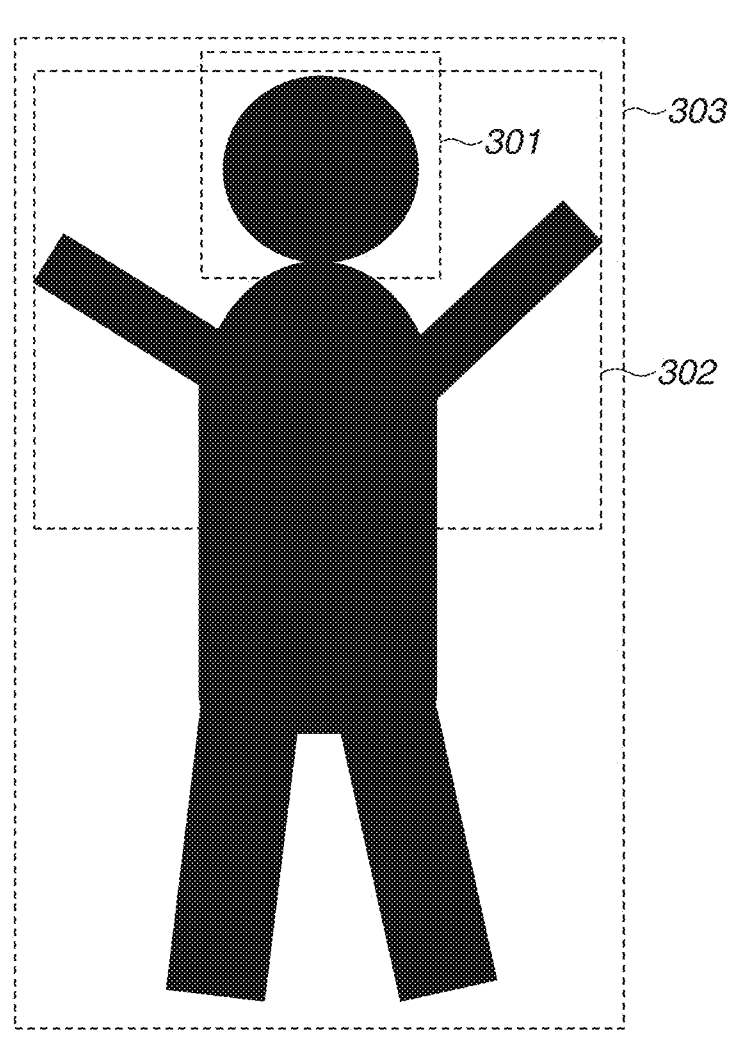
FIG. 3 is a diagram illustrating an example of setting information on tracking setting according to each of the exemplary embodiments.

Furthermore, as illustrated in FIG. 3, body parts, such as a face region 301, an upper-half body region 302, and a whole-body region 303 of the object 107 can be designated as the setting information for tracking (parameters).

In other words, a part of the object 107 to be preferentially captured (tracked) in a screen of the video image in the tracking can be designated. For example, with information on the face region 301 set as the setting information, the automatic tracking is performed to capture the face region 301 in a predetermined size at the center of the angle of view. With information on the whole-body region 303 set as the setting information, the automatic tracking is performed such that the whole-body region 303 falls within the angle of view.

The parameters and other information relating to the parts of the object described in the present exemplary embodiment are examples of the setting information for tracking, and the form of the setting information is not limited as long as the setting information is appropriate or useful in the tracking processing. For example, the setting information for tracking can be face detection information. If a face cannot be detected using the face detection information, namely, if the object does not face the front, the automatic tracking can be performed such that the object does not fall within the angle of view. The setting information for tracking can be a driving speed or driving torque in at least the pan driving, the tilt driving, or the zoom driving in the tracking. Moreover, the setting information for tracking can be information designating a region to be tracked.

The setting information for tracking is associated with the device identification (ID) and stored for each ID in the storage unit 206. The setting information can be designated by the user through the client apparatus 102, or previously stored in the network camera 101.

Figure 4:
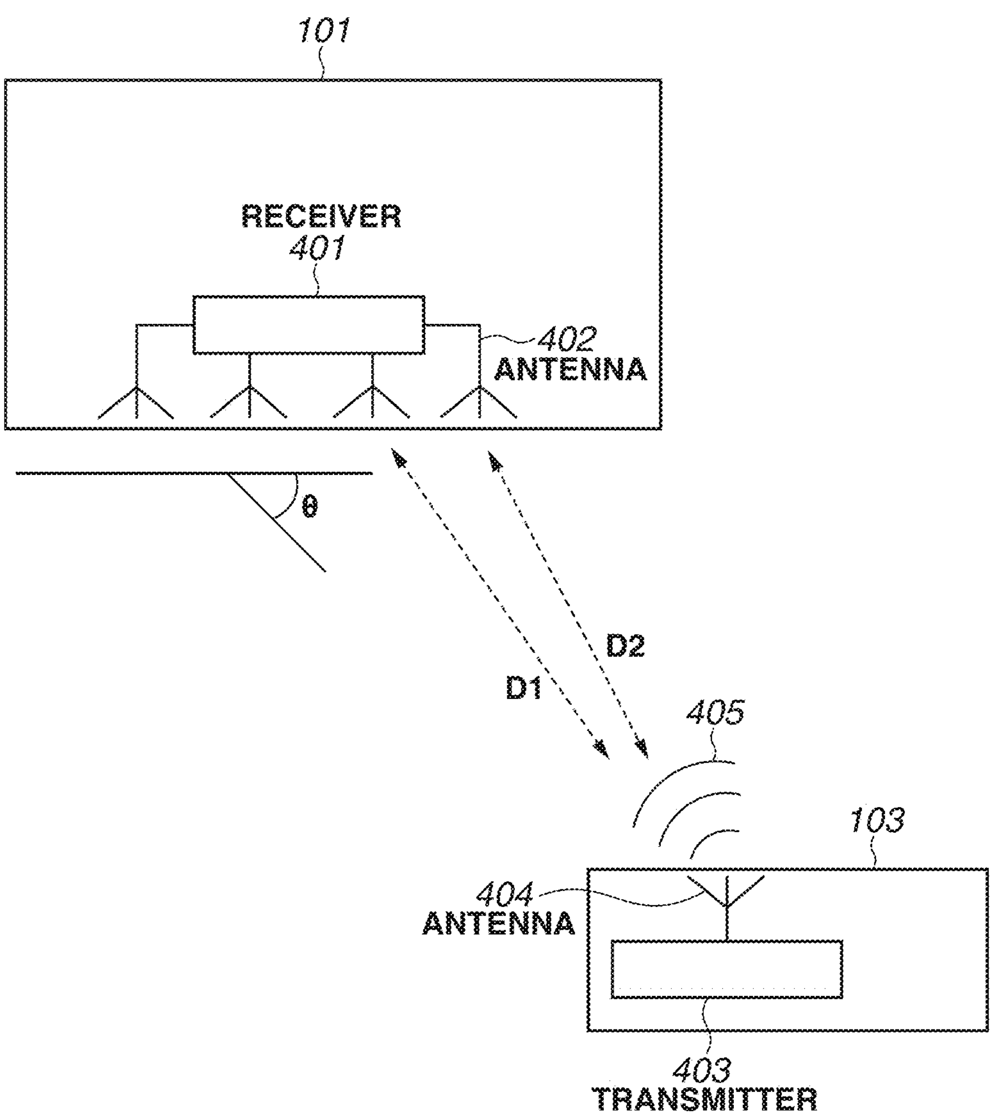
FIG. 4 is a diagram illustrating an example of processing for determining the direction of radio waves according to each of the exemplary embodiments.

FIG. 4 is a conceptual diagram illustrating an example of a principle for determining the radio wave direction from the wireless apparatus 103 by the network camera 101. In the direction detection function complying with the Bluetooth® 5.1 specification, the direction of incoming radio waves is detected using an antenna array including a plurality of antennae by utilizing a phase difference or phase differences in the radio waves due to different locations of the antennae.

The detection method mainly comes in two methods. One method is a method referred to as Angle Of Arrival (AoA), in which a reception device calculates the reception angle of radio waves. The other method is a method referred to as Angle Of Departure (AoD), in which a transmission device calculates an emission angle and transmits the emission angle to the reception device.

In the present exemplary embodiment, the wireless apparatus 103 is deemed as the transmission device, and the network camera 101 is deemed as the reception device, and the direction detection is performed by AoA. However, substantially similar effects are achievable by using AoD. In the following, the principle for determining the radio wave direction by the network camera 101 will be described with reference to FIG. 4.

The wireless communication unit 211 of the network camera 101 includes a receiver 401 and a plurality of antennae 402, and the wireless apparatus 103 includes a transmitter 403 and a single antenna 404. The transmitter 403 transmits radio waves 405 including a special direction detection signal from the antenna 404, and the plurality of antennae 402 of the network camera 101 receives the radio waves 405. At this time, as illustrated in FIG. 4, the plurality of antennae 402 arranged at equal intervals each receives the radio waves 405. As a result, the distance between the antenna on the transmitting device and each of the antennae on the receiving device varies like a distance D1 and a distance D2, and the radio-wave position determination unit 213 and the wireless communication unit 211 cooperate with each other to detect a signal of a different phase on each antenna. The receiver 401 acquires, as phase information on the radio waves, a modulation signal (an IQ modulation signal) having an in-phase phase component and an orthogonal phase component while switching active antennae. Thereafter, in the receiver 401, the radio-wave position determination unit 213 of the network camera 101 can calculate an incident angle θ that is a relative direction of the signal, based on the IQ modulation signal. The calculation is performed using the wavelength of the radio waves, the distance between the antennae, and the phase difference. However, the description of the calculation method is omitted because the calculation method is well-known. The network camera 101 can determine the current direction of the camera in a three-dimensional space by calibration performed in the installation of the network camera 101. Thus, the relative position of the wireless apparatus 103 can be determined using the direction of the radio waves received from the wireless apparatus 103.

The position determination execution control unit 216 converts the relative position of the wireless apparatus 103 determined by the radio-wave position determination unit 213, into a position on the image captured by the imaging unit 201.

The position determination execution control unit 216 determines the relative position of the captured image as viewed from the network camera 101 using the current angles in the pan direction and the tilt direction. Further, the position determination execution control unit 216 compares the relative position of the captured image with the relative position of the wireless apparatus 103, converting the relative position of the wireless apparatus 103 into the position on the image captured by the imaging unit 201.

Figure 5:
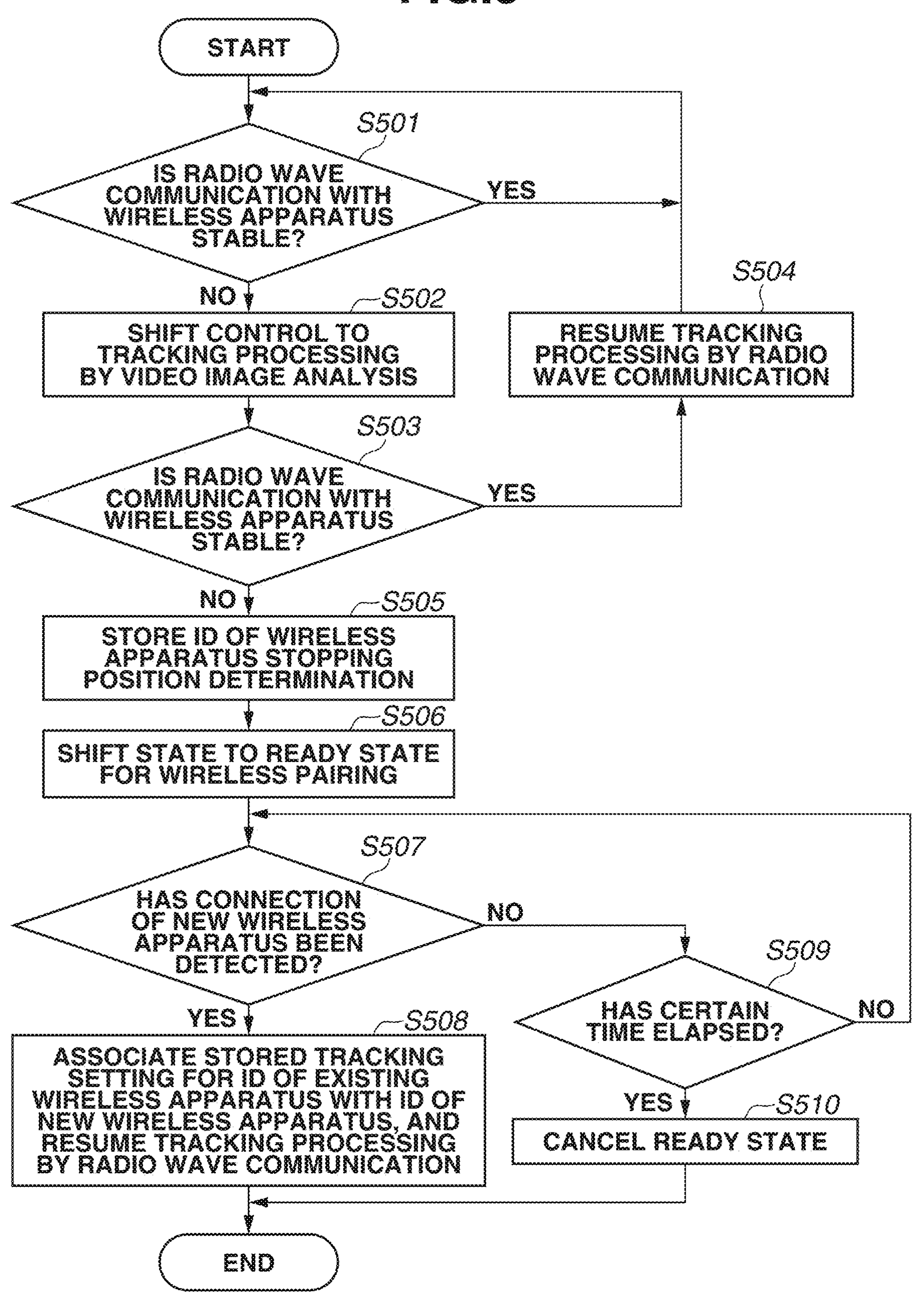
FIG. 5 is a flowchart illustrating processing for replacing a wireless apparatus according to a first exemplary embodiment.

FIG. 5 is a flowchart illustrating a procedure of processing performed by the network camera 101 according to the present exemplary embodiment.

After the automatic tracking is started, in step S501, the stability determination unit 215 determines whether the positional information is stably acquired from the wireless apparatus 103. To determine whether the positional information is stably acquired without being lost, the intensity of the radio waves received from the wireless apparatus 103 is used as an example. If the intensity of the radio waves is greater than or equal to a threshold, the stability determination unit 215 determines that the radio wave communication is stable. If the intensity of the radio waves is less than the threshold, the stability determination unit 215 determines that the radio wave communication is unstable. If the stability determination unit 215 determines that the radio wave communication is stable (YES in step S501), the current state (mode) is maintained. If the stability determination unit 215 determines that the radio wave communication is unstable (NO in step S501), the processing proceeds to step S502. If the frequency with which the intensity of the radio waves received from the wireless apparatus 103 is greater than or equal to the threshold is less than a predetermined frequency, the stability determination unit 215 can determine that the determination of the positional information using the wireless apparatus 103 is unstable.

Radio wave intensities are measured in decibel-milliwatts (dBm), and the determination is performed based on whether the numerical value is greater or less than a threshold. The output intensity of radio waves is defined by a certain wireless communication standard. For example, the Bluetooth® specifications define the reference range of radio wave intensities for each class. If the radio wave intensity is less than or equal to 30% of the maximum value of the range, it is determined that the determination of the positional information is unstable.

In step S502, the position determination execution control unit 216 stops the currently-used position determination using the wireless apparatus 103 performed by the radio-wave position determination unit 213. Further, the position determination execution control unit 216 switches the control to perform the position determination and the automatic tracking using the position determination alone performed by the video-image analysis position determination unit 214. In other words, the automatic tracking using the position determination performed by the radio-wave position determination unit 213 is also stopped.

In step S503, a certain time after the control is switched to perform the position determination and the automatic tracking using the position determination alone performed by the video-image analysis position determination unit 214, the stability determination unit 215 again determines whether the radio wave communication is stable. If the stability determination unit 215 determines that the radio wave communication is stable (YES in step S503), the processing proceeds to step S504. In step S504, the position determination execution control unit 216 resumes the position determination performed by the radio-wave position determination unit 213.

If the stability determination unit 215 determines that the radio wave communication is unstable again (NO in step S503), the processing proceeds to step S505. The processing can immediately proceed to step S505 by omitting the processing in step S503. In other words, if the intensity of the radio waves received from the wireless apparatus 103 is less than the predetermined threshold even in the predetermined time, it is finally determined that the tracking processing using the wireless apparatus 103 is to be stopped (without resuming the tracking processing).

In step S505, the device ID of the wireless apparatus 103 with which the radio wave communication is determined to be unstable by the stability determination unit 215 is stored in the storage unit 206. The tracking control unit 218 holds the device ID of the wireless apparatus 103 as a parameter for tracking control as a setting value. However, the device ID of the wireless apparatus 103 is stored as a device ID with which the radio wave communication does not normally operate, in the storage unit 206.

In step S506, the position determination execution control unit 216 makes the wireless communication unit 211 transition to a ready state (mode) for connection with a new wireless apparatus. The ready state allows a connection request from an unconnected wireless apparatus to be received, and the connection of wireless communication to be established in response to the reception of the connection request from a new apparatus. The ready state (mode) indicates a state where, when a specific connection request signal is received from another wireless apparatus, the connection with the wireless apparatus is established. Even when the connection request signal is received in a state other than the ready state, the connection is not established. To establish the connection of wireless communication with the new apparatus, the wireless communication unit 211 is explicitly made to transition to the ready mode.

The wireless connection method according to the present exemplary embodiment is merely an example, and for example, as with the Bluetooth® specification, the wireless apparatuses can perform pairing in response to a button operation or another operation. However, it is desirable to make the wireless communication unit 211 transition to the ready state that allows connection between the wireless apparatuses, without operation by the user as much as possible.

In step S507, the wireless communication unit 211 detects whether the connection with the new wireless apparatus 104 is successful. If the success is detected (YES in step S507), the processing proceeds to step S508. Otherwise (NO in step S507), the processing proceeds to step S509.

In step S508, with the detection of the connection with the new wireless apparatus 104, the device ID stored in step S505 is acquired, and the tracking control unit 218 acquires the setting information associated with the device ID of the wireless apparatus 103 in which the position determination has been stopped in step S502, from the storage unit 206.

The acquired setting information is associated with the device ID of the wireless apparatus 104 newly connected, and is then stored in the storage unit 206. Further, the position determination execution control unit 216 sets the acquired setting information to the radio-wave position determination unit 213 and the tracking control unit 218. Thereafter, the tracking control unit 218 starts the automatic tracking based on the position determination by the new wireless apparatus 104. It is unnecessary to take over all of the setting information on the wireless apparatus previously used, and it is sufficient for the automatic tracking using the new wireless apparatus 104 to take over at least part of the setting information. In other words, it is sufficient to use the setting information based on the setting information on the wireless apparatus 103 previously used, in the automatic tracking using the new wireless apparatus 104. Further, the setting information on the wireless apparatus 103 previously used can be used as the setting information for the automatic tracking using the new wireless apparatus 104 as it is.

In step S509, the processing waits for the connection with a new wireless apparatus for a predetermined time. If the connection with a new wireless apparatus is not detected (YES in step S509), the processing proceeds to step S510. In step S510, the ready state of the wireless communication unit 211 is cleared, and the processing then ends.

As described above, when it is determined that the tracking processing using the existing wireless apparatus 103 is stopped, the mode automatically transitions to a mode for establishing the connection with a new wireless apparatus. When the connection with the new wireless apparatus 104 is established, the setting information based on the setting information used in the existing wireless apparatus 103 is now used as the setting information about the tracking processing for the object using the new wireless apparatus 104. Thus, even if the wireless apparatus used for tracking is replaced, this facilitates the setting for the tracking.

Figure 6:
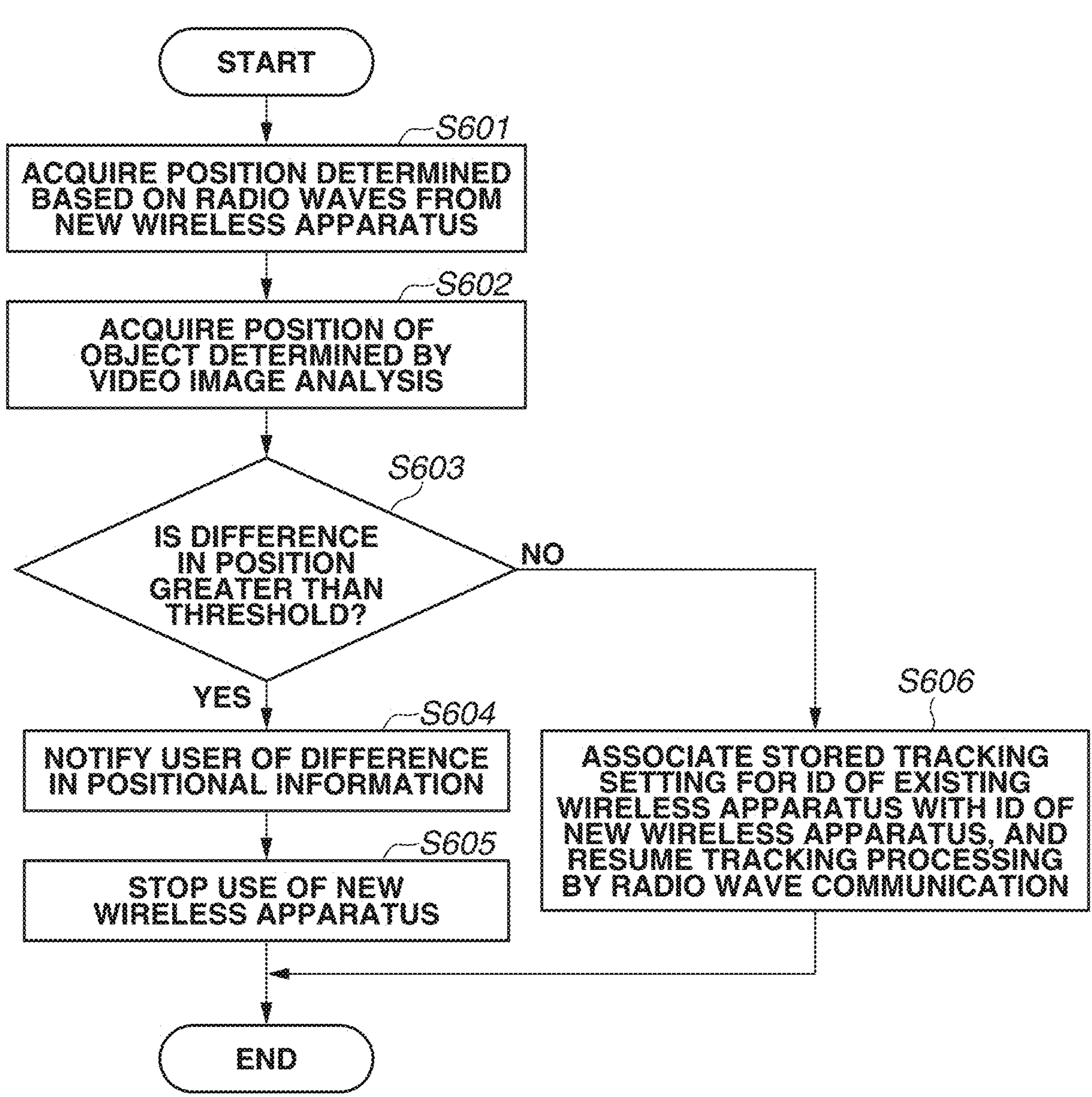
FIG. 6 is a flowchart illustrating processing for determining whether a connected wireless apparatus is a wireless apparatus of a supposed replacement, according to a second exemplary embodiment.

A second exemplary embodiment will be described with reference to the block diagram in FIG. 1 and a flowchart in FIG. 6. More specifically, processing will be described in a case where a new wireless apparatus different from a supposed replacement (e.g., wireless apparatus held by an object different from a supposed object) is connected to the network camera 101. The description about the part similar to the above-described exemplary embodiment will be omitted as appropriate.

In step S601, the position determination execution control unit 216 acquires the position of an object determined by the radio-wave position determination unit 213 based on information about radio waves acquired from the newly-connected wireless apparatus.

In step S602, the position determination execution control unit 216 acquires the position of the object determined by the video-image analysis position determination unit 214.

In step S603, the position determination execution control unit 216 compares the positions of the object acquired in step S601 and in step S602. At this time, the comparison is performed with the position of the object acquired from the new wireless apparatus converted into a position on the video image by the position determination execution control unit 216.

Figure 7B:
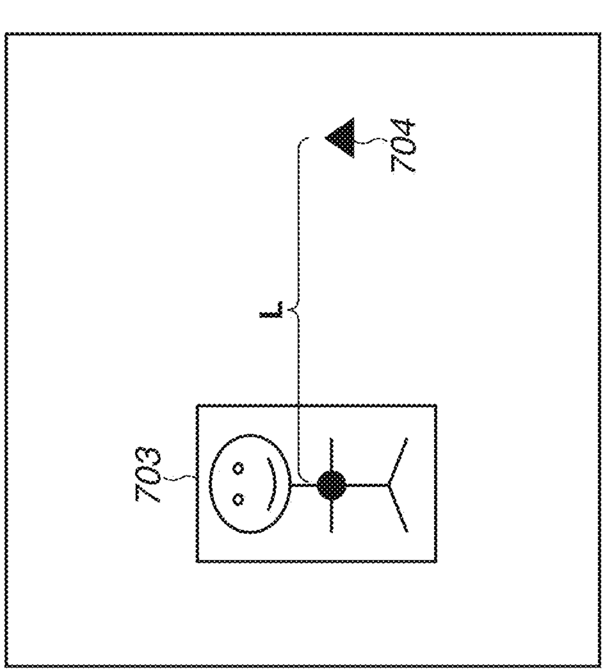
FIGS. 7A and 7B are diagrams each illustrating an example of the position of an object determined from an image according to the second exemplary embodiment.
Figure 7A:
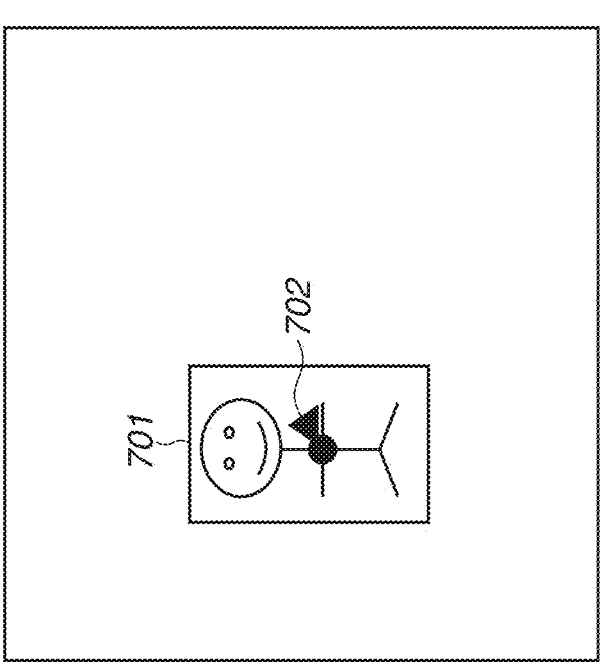

As illustrated in FIG. 7A, there is no large difference between the center position of an object region 701 acquired by the video image analysis and a position 702 of the wireless apparatus acquired from the radio wave information, indicating that the positional information on the wireless apparatus held by the object is correctly acquired, which leads to a determination that the wireless apparatus is a wireless apparatus to be replaced. For example, if the difference (distance L) between the center position of the object region 701 acquired by the video image analysis and the position 702 of the wireless apparatus acquired from the radio wave information is less than or equal to a predetermined threshold, the position determination execution control unit 216 determines that a correct wireless apparatus is connected. Further, the distance can be calculated as the number of pixels.

In contrast, if the distance L between the center position of an object region 703 acquired by the video image analysis in step S602 and a position 704 of the wireless apparatus acquired from the radio wave information is greater than the threshold as illustrated in FIG. 7B, the following processing is performed. The position determination execution control unit 216 determines that the newly-connected wireless apparatus is faulty, or a wireless apparatus different from the wireless apparatus held by the object is connected. If the distance L between the two positions is greater than the threshold (YES in step S603), the processing proceeds to step S604. If the distance L between the two positions is less than or equal to the threshold (NO in step S603), the processing proceeds to step S606.

In step S604, the user is notified that the position acquired in step S601 and the position acquired in step S602 are largely different, and/or the wireless apparatus is not correctly replaced. A notification method is not limited as long as the result is notified to the user. For example, the notification is performed with a blinking pattern of a light-emitting diode (LED) mounted on the network camera 101, or a predetermined message can be displayed on a display unit.

In step S605, the use of the position determination by the new wireless apparatus and tracking processing using the new wires apparatus are stopped. A method for stopping the use is not limited as long as the use of the tracking processing associated with the device ID stored in the storage unit 206 is stopped. For example, a method can be employed of disconnecting the wireless connection with the new wireless apparatus.

In step S606, the device ID stored in step S505 is acquired, and the setting information associated with the acquired device ID is acquired from the setting information for tracking held by the tracking control unit 218.

Further, the acquired setting information is associated with the device ID of the newly-connected wireless apparatus, the tracking control unit 218 notifies the position determination execution control unit 216 of the update of the setting, and the position determination execution control unit 216 starts the position determination performed by the radio-wave position determination unit 213. The operation is basically the same as the operation in step S508. The processing then ends.

As described above, even if a wireless apparatus different from the supposed replacement is erroneously connected, the erroneous connection can be properly notified to the user.

While the exemplary embodiments of the present disclosure have been described above, the present disclosure is not limited to these exemplary embodiments. Various modifications and changes can be made within the gist of the present disclosure.

Other Exemplary Embodiments

As described with reference to FIG. 2, the configurations of the network camera (imaging apparatus including the control apparatus) 101 other than the imaging element and the lens, and the client apparatus 102 in the exemplary embodiments can be implemented with hardware configurations. Such hardware configurations include the RAM 206 temporarily storing computer programs to be executed by the CPU 212. The RAM 206 further temporarily stores data (commands and video image data) and other information acquired from outside through a wired communication interface (the wired communication unit 210) or a wireless communication interface (the wireless communication unit 211). The RAM 206 also provides a work area used when the CPU 212 performs various kinds of processing. The RAM 206 also function as, for example, a frame memory and a buffer memory.

The CPU 212 executes computer programs stored in the RAM 206. Other than the CPU 212, a processor, such as a digital signal processor (DSP), or an application specific integrated circuit (ASIC), can be used.

The ROM 206, such as an HDD, stores programs of an operating system and video image data. The ROM 206 also stores computer programs.

The computer programs and the data stored in the ROM 206 are appropriately loaded to the RAM 206 under the control of the CPU 212, and are executed by the CPU 212.

Other than the HDD, another storage medium, such as a flash memory, can be used. The bus 207 connects pieces of hardware together. The pieces of hardware exchange data each other through the bus 207.

The described above is a description of the hardware configurations according to the exemplary embodiments.

The present disclosure can be implemented by one or more processors reading and executing programs carrying out one or more functions of the above-described exemplary embodiments. The programs can be supplied to a system or an apparatus including the one or more processors through a network or a storage medium.

Further, the present disclosure can be realized with circuitry (e.g., ASIC) carrying out one or more functions of the above-described exemplary embodiments.

The control apparatus according to the exemplary embodiments can be the hardware illustrated in FIG. 2 or software.

The present disclosure is not limited to the above-described exemplary embodiments, and various changes can be made without departing from the gist of the present disclosure. For example, combinations of each of the exemplary embodiments and modifications are also included in the disclosed contents of the present specification.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-104585, filed Jun. 26, 2023, which is hereby incorporated by reference herein in its entirety.

What is claimed is:

1. A control apparatus comprising:

at least one memory storing instructions; and at least one processor that, upon execution of the instructions, is configured to operate as:

a communication unit configured to communicate with a first wireless apparatus for determining a position of an object, the first wireless apparatus being held by the object;

an acquisition unit configured to acquire first setting information for tracking processing on the object using the first wireless apparatus;

a tracking control unit configured to control the tracking processing on the object based on radio waves received from the first wireless apparatus by the communication unit and the first setting information; and a determination unit configured to determine whether to stop the tracking processing using the first wireless apparatus, based on an intensity of the radio waves received from the first wireless apparatus, wherein, when the determination unit determines that the tracking processing using the first wireless apparatus is to be stopped, the communication unit transitions to a mode for connecting a new wireless apparatus, and wherein, when the communication unit and the new wireless apparatus are connected, the tracking control unit uses second setting information based on the first setting information, as setting information for tracking processing on the object using the new wireless apparatus.

2. The control apparatus according to claim 1, wherein, in response to connection of the new wireless apparatus for determining the position of the object, the tracking control unit starts the tracking processing based on radio waves received from the new wireless apparatus and the second setting information.

3. The control apparatus according to claim 1, wherein, in a case where an intensity of the radio waves received from the first wireless apparatus is less than a predetermined threshold, the determination unit determines that the tracking processing using the first wireless apparatus is to be stopped.

4. The control apparatus according to claim 1, wherein, in a case where a frequency with which the intensity of the radio waves received from the first wireless apparatus is greater than or equal to a predetermined threshold is less than a predetermined frequency, the determination unit determines that the tracking processing using the first wireless apparatus is to be stopped.

5. The control apparatus according to claim 1, wherein, in a case where an intensity of the radio waves received from the first wireless apparatus is less than a predetermined threshold, and the intensity of the radio waves received from the first wireless apparatus is less than the predetermined threshold even in a predetermined time, the determination unit determines that the tracking processing using the first wireless apparatus is to be stopped.

6. The control apparatus according to claim 1, wherein the first setting information and the second setting information for tracking processing at least includes information that designates a part of the object to be tracked.

7. The control apparatus according to claim 1, wherein the second setting information at least includes an identifier that identifies the new wireless apparatus and at least part of the first setting information.

8. The control apparatus according to claim 1, wherein execution of the stored instructions further configures the at least one processor to operate as:

a determination unit configured to determine a position of the object by performing video image analysis on image data acquired by an imaging unit.

9. The control apparatus according to claim 8, wherein, in a case where a difference between a position of the object based on radio waves received from the new wireless apparatus and a position of the object determined by the determination unit is greater than a predetermined value, the tracking control unit does not start the tracking processing on the object using the new wireless apparatus.

10. The control apparatus according to claim 8, wherein, at least after the tracking processing using the first wireless apparatus is stopped until the tracking processing on the object using the new wireless apparatus is started, the tracking control unit performs control to perform the tracking processing on the object using the determination unit.

11. The control apparatus according to claim 1, wherein the first setting information and the second setting information are the same setting information.

12. A control method, comprising:

communicating with a first wireless apparatus held by an object using a communication unit;

acquiring first setting information for tracking processing on the object using the first wireless apparatus;

controlling the tracking processing on the object based on radio waves received from the first wireless apparatus in the communicating and the first setting information; and determining whether to stop the tracking processing using the first wireless apparatus, based on the radio waves received from the first wireless apparatus, wherein, when it is determined that the tracking processing using the first wireless apparatus is to be stopped, the communication unit is made to transition to a mode for connecting a new wireless apparatus, and wherein, when the communication unit and the new wireless apparatus are connected, second setting information based on the first setting information is used as setting information for tracking processing on the object using the new wireless apparatus, in the controlling.

13. A non-transitory computer-readable storage medium storing a program that when executed by at least one processor, causes the at least one processor to execute a control method, the control method comprising:

communicating with a first wireless apparatus held by an object using a communication unit;

acquiring first setting information for tracking processing on the object using the first wireless apparatus;

controlling the tracking processing on the object based on radio waves received from the first wireless apparatus in the communicating and the first setting information; and determining whether to stop the tracking processing using the first wireless apparatus, based on the radio waves received from the first wireless apparatus, wherein, when it is determined that the tracking processing using the first wireless apparatus is to be stopped, the communication unit is made to transition to a mode for connecting a new wireless apparatus, and wherein, when the communication unit and the new wireless apparatus are connected, second setting information based on the first setting information is used as setting information for tracking processing on the object using the new wireless apparatus, in the controlling.

* * * * *